United States Patent Office 3,460,650
Patented Aug. 12, 1969

3,460,650
ARTICULATED JOINTS
Edmond Henry-Biabaud, Paris, France, assignor to Societe Anonyme Andre Citroen, Paris, France, a French society
Continuation-in-part of application Ser. No. 476,926, Aug. 3, 1965. This application Nov. 6, 1967, Ser. No. 686,363
Claims priority, application France, Aug. 6, 1964, 984,330; Nov. 21, 1966, 84,385; Feb. 9, 1967, 94,276
Int. Cl. F01m 9/12, 11/04
U.S. Cl. 184—105    12 Claims

ABSTRACT OF THE DISCLOSURE

An articulated joint having a movable ball held in a flexible, apertured seat and which is automatically and continuously lubricated. The aperture in the seat communicates with a grease reservoir disposed in a casing surrounding the assembly so that upon movement of the ball the seat is moved to allow grease to penetrate into the joint.

---

This is a continuation-in-part application of my copending patent application Ser. No. 476,926 filed Aug. 3, 1965, now abandoned.

It is known that articulated joints, particularly ball joints, comprise a seat having a recess in which is mounted a ball secured to a pivot fixed to one of the articulation elements, the seat being moreover disposed inside a casing fixed on the other articulation element. In general, chambers are provided either on the inside surface of the seat or on the ball, and contain a grease which is put in position at the time of mounting in order to ensure lubrication.

However, it has been found necessary to provide a considerable number of these chambers, since it is obviously impossible to ensure permanent lubrication by grease circulation. Nevertheless, there is often abnormal wear on one or other of the elements, viz. the seating and/or the ball, which is capable of creating appreciable and harmful play between the two articulation elements.

The present invention has for an object a method and apparatus for automatically greasing articulated joints of the type hereinabove referred to, by grease circulation. This method and apparatus essentially consist of using the load variations of a ball joint on its seat to cause the suction of grease which is held in a reservoir communicating with the zone of contact of the ball joint with the seat.

According to another object of the invention, a communication conduit is provided connecting a pumping chamber, formed between the ball joint and its seat, with the reservoir. The volume of the pumping chamber varies in accordance with the load applied to the joint and the communication conduit is provided with a non-return valve which opens in the direction of the reservoir towards the pumping chamber.

In a preferred embodiment, the conduit is bored through the ball joint itself.

In order that the invention may be more clearly understood, reference will now be made to the accompanying drawings which show four embodiments thereof by way of example and in which.

Figure 1:
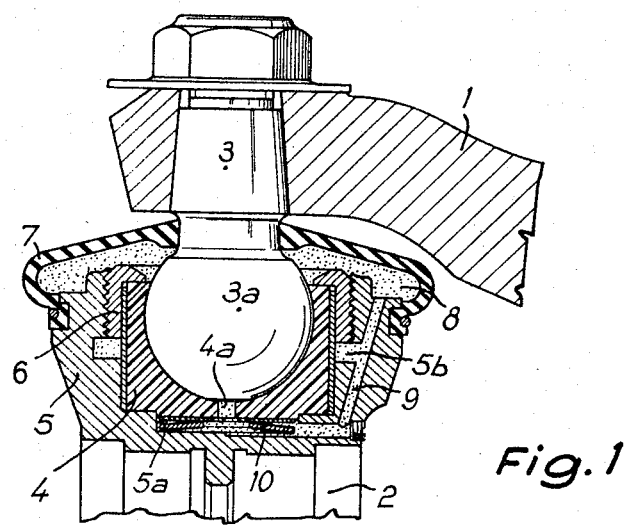
FIGURE 1 illustrates a section of one form of articulated joint according to the invention taken through a plane passing through the axis of the ball pivot.

With reference first to FIGURE 1, there are shown two articulation elements 1 and 2 which are capable of relative rotational movement about a vertical axis and relative rotational movement or more precisely oscillations, about a horizontal axis.

On the element 1 is fixed a pivot 3, the lower portion of which consists of a ball 3a. The ball is disposed inside a seat 4 preferably constituted by a cylindrical part having a spherical recess or socket of a diameter corresponding to that of the ball. The seat 4 is in turn mounted in a casing 5 secured rigidly to the articulation element 2 fixed to the casing 5 by means of a flange 6 which screws into the body of the casing. The seat 4 may be constructed of any suitable material, such as plastic material or metal, which has an appreciable elasticity for reasons which will be specified hereinafter.

A cover 7, which is fluid-tight and elastic, for example of rubber or of plastic material of suitable quality such as that known under the trade name "Vulkollan," is fixed about the pivot 3, preferably on a neck of the pivot situated above the ball 3a to provide a seal at the neck and with the casing 5 to provide another grease seal. It is essential that the cover 7 is joined to the neck and casing 5 in fluid-tight relationshp. The cover 7 defines with the casing 5 and a portion of the ball 3a, a chamber or reservoir 8 filled with grease thus constituting a reserve of lubricant. A passage 9 connects the chamber 8 to a chamber 5a provided in the casing under the bottom end of the seat 4. Preferably, there is provided, halfway up the casing and communicating with the passage 9, an annular chamber 5b forming an additional grease reserve. In the bottom end of the seat 4, and preferably on the axis of the pivot 3, there is provided an aperture 4a in communication with the spherical recess of the seat 4 and the chamber 5a. Finally, in the chamber 5a there is mounted an elastic device, for example a spring such as a conical washer 10, resting on the casing 5, and engaging the bottom of the seat 4.

The lubrication of the articulation is effected in the following manner: the force which the articulation element 1 impresses on the articulation element 2 is most often directed downwards in such a manner that the bottom of the seat 4 is slightly deformed and to some extent compresses the spring 10. When the axial load diminishes, the spring 10 tends to resume its original shape and to urge the bottom of the seat in the opposite direction. The result is that the volume of the chamber 5a increases, which causes the grease contained in the passage 9 to be sucked into the chamber 5a, the grease in the chamber 8 thus being sucked into the passage 9 and a delivery of the grease along the surface of the ball into the chamber 8. The delivery towards the ball can be ensured by giving the inside surface of the seat a form such that it forms a valve by changing its shape under load; however, even if the flow of lubricant is not completely blocked, the difference in loss of load under the seat between suction and delivery is sufficient to exert a directional effect on the movement of the lubricant. Thus, an almost constant circulation of grease is obtained in all cases where there exist variation in the load of element 1 on element 2 and especially when the articulation is used in the suspenson members of a motor vehicle.

As has already been indicated, the seat 4 may be of any suitable material, but the thickness of the bottom comprising the aperture 4a as well as the characteristics of the spring 10 will be determined in order to obtain a sufficient variation in the volume of the chamber 5a when variations in the load occur. Moreover, it may be advantageous that the seat and more especially its inside face be shaped in such a manner that under load the passage 9 is at least partially closed.

Figure 2:
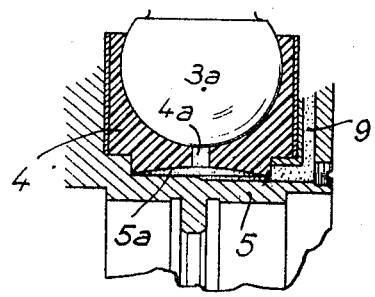
FIGURE 2 is a view similar to that of FIGURE 1, of a second embodiment of the invention.

With reference now to FIGURE 2, there is shown an alternative construction in which the seat 4 is preferably of plastic material. The bottom end of the seat, comprising the communication aperture 4a has a slight concavity downwards, that is, facing in the opposite direction to the ball 3a. The concavity defines, with the casing 5, a chamber 5a entirely similar to that described above, the elasticity of the bottom of the seat being, however, sufficient so that it is necessary to provide any supplementary elastic device.

Figure 3:
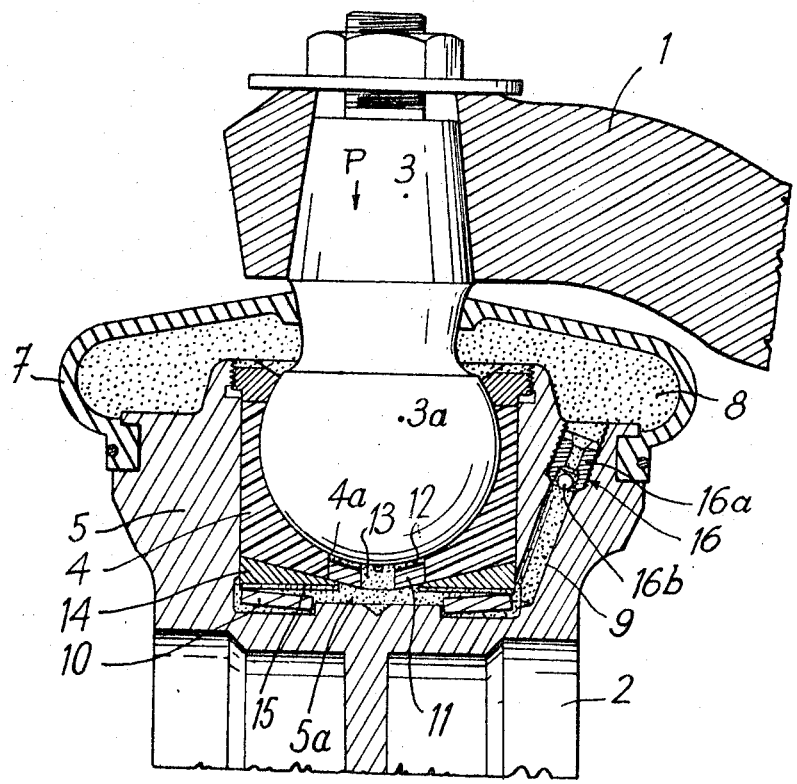
FIGURE 3 shows a section through a vertical plane of a third embodiment of the invention.

Referring now to FIG. 3, there is shown in the base of the seat 4, along the general axis of the ball joint 3a an opening 4a in which a washer 11 is inserted. The upper face of this washer, in contact with the spherical surface of the joint, is provided with radial grooves 12; in addition, a central hole 13 passes there through.

The seat 4 and the outer edge of the washer 11 rest on a second washer 14 which does not block the hole 13. Radial grooves 15 are also provided in the lower face of the washer 14. Finally, there is located in the casing 5 a resilient washer 10 which normally separates the lower face of the second washer 14 from the base of the casing. There is thus formed a chamber 5a whose volume may vary as a function of the more or less pronounced deflection of the resilient washer 10 under the effect of the variable load P exerted on the pivot 3.

A conduit 9 which opens into the chamber 8 containing the lubricant is bored in the casing 5 on the periphery of the chamber 5a. In this conduit, there is mounted a non-return valve 16 constituted by an externally threaded sleeve 16a screwed into the conduit and housing a ball 16b.

The device as just described operates as follows. When the load P decreases, the volume of the chamber 5a increases, and lubricant is induced through the conduit 9, through the non-return valve 16, which opens in this direction.

When the load P increases, the volume of the chamber 5a tends to decrease. The ball 16b is pushed back onto its seat and closes the conduit 9.

This results in two appreciable effects. the lubricant contained in the chamber 5a and in the conduit 9 up to the ball 16b is subjected to compression; it partly absorbs the over-load carried by the joint. In addition, this lubricant is driven back through the hole 13 and the grooves 12 and it rises along the spherical surface of the ball member 3a while penetrating between said latter and its seat 4. Lubrication is, therefore, ensured with certainty.

Figure 4:
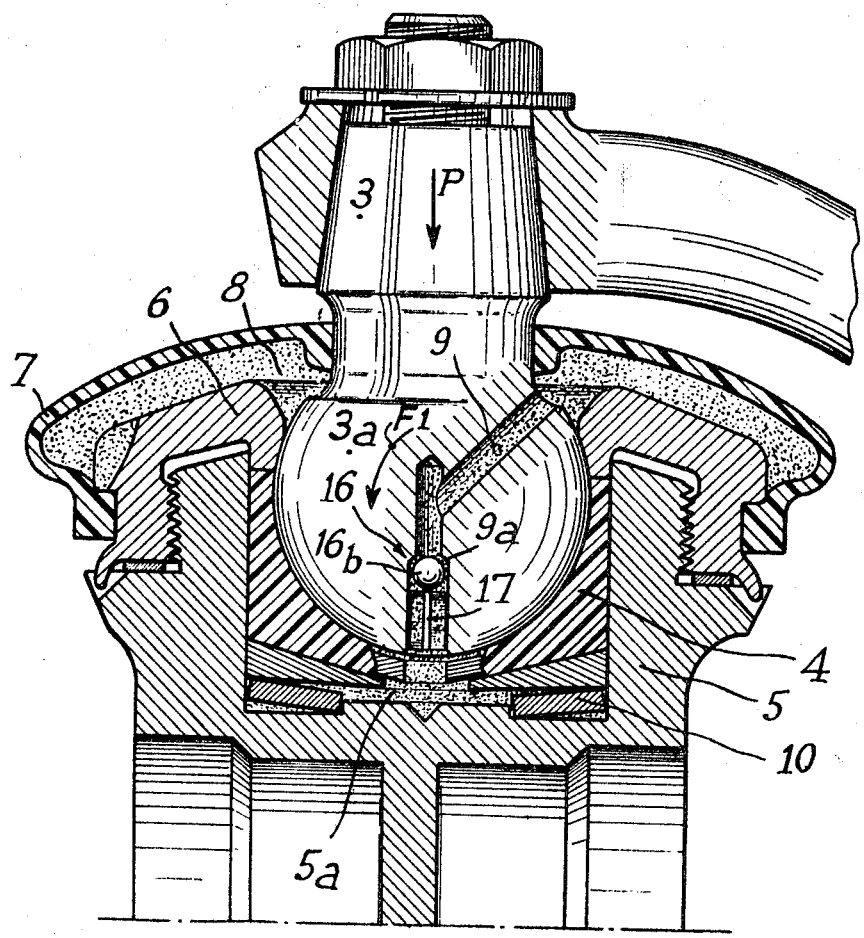
FIGURE 4 shows a fourth embodiment of the joint.

The fourth embodiment of the joint, illustrated in FIGURE 4, comprises the elements as described previously with regard to FIGURE 3 and further includes a nut 6 screwed on the casing 5 to hold the ball 3a on seat 4 and the latter in the casing 5.

A resilient, tight sheath 7 made of rubber or plastic material is aplied over the pivot 3 above the ball member 3a and over the nut 6. This sheath defines the chamber 8 containing the lubricant.

According to this fourth embodiment, the channel 9 which opens out into the chamber 8 is bored in the ball 3a and arrives at the pumping chamber 5a. This latter is identical to the chamber 5a of FIGURE 3 and, therefore, its volume may be modified under the effect of the variations of the load P applied to the pivot 3, due to a resilient washer 10.

One part of the conduit 9 has a shoulder 9a acting as a seat against which a ball 16b may be applied. This latter is held in the channel 9, near its seat by means of a cross head 17 which is forced into the channel. This arrangement acts in the manner of a non-return valve 16 allowing the lubricant to circulate in the direction of the arrow F1 in a single direction: chamber 8, chamber 5a. From there, the lubricant is driven back between the ball 3a and the seat 4.

Figure 5:
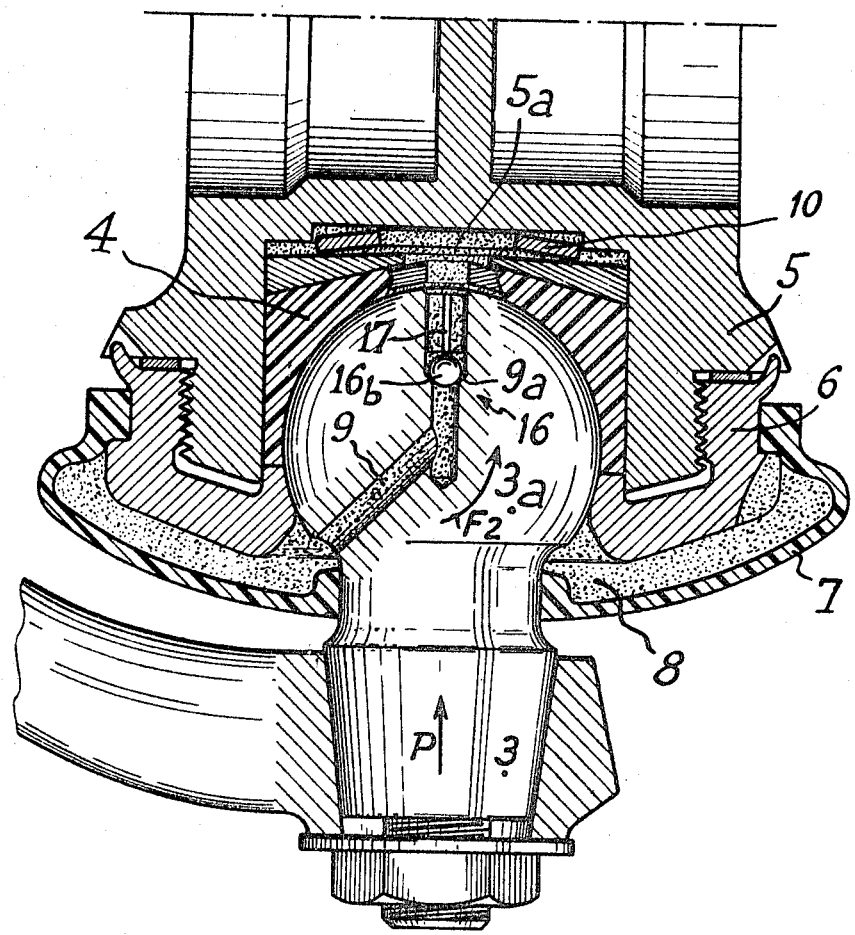
FIGURE 5 shows a view of a reversed assembly of the joint of FIG. 4.

FIGURE 5 shows a reversed assembly of the joint of FIGURE 2. The channel 9, provided with a non-return valve 16, is again bored in the ball member 3a between the tank 8, situated in the lower part and the pumping chamber 5a.

This assembly exhibits one particular advantage of the invention. Although the circulation of the lubricant is effected from the chamber 8, in the direction of the arrow F2 against the action of gravity, it is nevertheless effected in all safety with the aid of the valve 16.

Obviously, the invention is not limited to the embodiments which have just been described, but covers, on the contrary, all the alternative versions. In a general manner, the communication aperture will be disposed in the surface of the seat which is subject to the greatest variations of load, said surface and also optionally the zone facing the casing being shaped in a suitable manner to provide a chamber the volume of which varies under the effect of the variations in load.

What is claimed is:

1. An automatic greasing device for an articulated joint comprising a ball in a seat, said seat being apertured and located in a casing, said aperture in said seat being in communication with a grease reservoir disposed in said casing and partially limited by a portion of the ball projecting outside said seat, said ball deforming said seat when said ball is placed under a load to thereby allow a required amount of grease to be sucked onto the ball, through said aperture, when said load has been released.

2. A device according to claim 1, wherein said seat is of plastic material and its bottom, in the region comprising said aperture in communication with the said grease reservoir has a recess facing in the opposite direction to the ball to aid in the readjustment of said seat when said load is released.

3. A device according to claim 1 further comprising an elastic member interposed between said casing and the bottom of said seat having said aperture communicating with said grease reservoir to aid in the readjustment of said seat when said load is released.

4. The device of claim 3 wherein said elastic member is a conical washer.

5. The device of claim 4 in which said reservoir includes a chamber, formed above said ball, into which grease is caused to flow, after having flowed over the surface of the ball, by the action of the conical washer tending to deform the seat, upon release of the load, in the direction opposite to the deformation caused by the application of the load to the seat.

6. A device according to claim 1 wherein said casing has an entry passage for the lubricant formed therein, which entry passage is at least partially obstructed by the seat when said device is placed under load.

7. The device of claim 1 further including a conduit connecting said grease reservoir with said aperture; said conduit having a non-return valve mounted therein which allows grease to flow from said reservoir to said aperture.

8. The device of claim 7, wherein said conduit is bored through said ball.

9. A grease sealed ball joint comprising a ball, a flexible seat serving as a socket for said ball, said ball extending into said socket through an open end thereof, an aperture in said seat at other end thereof, a grease chamber contiguous to said other end and in communication with said socket through said aperture, a channel placing said chamber in communication with said socket at a location adjacent to said open end whereby when the load on said joint is varied and said ball oscillates to deflect said seat and vary the volume of said chamber, grease is sucked into said socket through said aperture to lubricate said joint.

10. The ball joint defined in claim 9 wherein a spring is disposed in said chamber to support the portion of said seat adjacent to said aperture by urging said portion towards said open end.

11. The ball joint defined in claim 9 wherein the said other end of said seat has a concave recess facing said grease chamber and wherein said aperture passes from said recess into said socket.

12. The ball joint defined in claim 9 further comprising a casing, said casing surrounding and holding said seat, a cover, said cover sealed to said casing and extending upwardly therefrom to provide a second grease chamber, said second grease chamber being in communication with said channel and said socket.

References Cited

UNITED STATES PATENTS 2,686,089  8/1954  Nardulli et al. _____ 308—8:
2,974,599  3/1961  Dolza _____ 103—148 XI FRED C. MATTERN, Jr., Primary Examiner M. ANTONAKAS, Assistant Examiner U.S. Cl. X.R.

277—212